(12) United States Patent
Lukin et al.

(10) Patent No.: US 8,913,900 B2
(45) Date of Patent: Dec. 16, 2014

(54) METHOD AND APPARATUS FOR FAULT-TOLERANT QUANTUM COMMUNICATION BASED ON SOLID-STATE PHOTON EMITTERS

(75) Inventors: Mikhail Lukin, Cambridge, MA (US); Lilian I. Childress, Somerville, MA (US); Jacob M. Taylor, Cambridge, MA (US); Anders S. Sorensen, Copenhagen (DK)

(73) Assignee: President and Fellows of Harvard College, Cambridge, MA (US)

( * ) Notice: Subject to any disclaimer, the term of this patent is extended or adjusted under 35 U.S.C. 154(b) by 1532 days.

(21) Appl. No.: 12/090,020

(22) PCT Filed: Oct. 11, 2006

(86) PCT No.: PCT/US2006/039632
§ 371 (c)(1),
(2), (4) Date: Sep. 8, 2008

(87) PCT Pub. No.: WO2007/044759
PCT Pub. Date: Apr. 19, 2007

(65) Prior Publication Data
US 2011/0222848 A1    Sep. 15, 2011

Related U.S. Application Data

(60) Provisional application No. 60/725,414, filed on Oct. 11, 2006.

(51) Int. Cl.
*H04B 10/70* (2013.01)
*H04B 10/00* (2013.01)

(52) U.S. Cl.
CPC ............... *H04B 10/30* (2013.01); *H04B 10/70* (2013.01)
USPC ......................................... 398/176

(58) Field of Classification Search
CPC ................................. H04B 10/30; H04B 10/70
USPC ................................................ 398/173, 180
See application file for complete search history.

(56) References Cited

U.S. PATENT DOCUMENTS

2007/0252081 A1* 11/2007 Munro et al. ............. 250/282

FOREIGN PATENT DOCUMENTS

WO    WO 03/101013 A1 * 12/2003    ............. H04B 10/00

OTHER PUBLICATIONS

Z. Zhao et al., "Experimental Realization of Entanglement concentration and a Quantum Repeater", Physical Review Letter, vol. 90, No. 20, 2003.*

* cited by examiner

*Primary Examiner* — Shi K Li
(74) *Attorney, Agent, or Firm* — 24IP Law Group; Timothy R DeWitt

(57) ABSTRACT

A novel method and apparatus for long distance quantum communication in realistic, lossy photonic channels is disclosed. The method uses single emitters of light as intermediate nodes in the channel. One electronic spin and one nuclear spin coupled via the contact hyperfine interaction in each emitter, provide quantum memory and enable active error purification. It is shown that the fixed, minimal physical resources associated with these two degrees of freedom suffice to correct arbitrary errors, making our protocol robust to all realistic sources of decoherence. The method is particularly well suited for implementation using recently-developed solid-state nano-photonic devices.

6 Claims, 3 Drawing Sheets

METHOD AND APPARATUS FOR FAULT-TOLERANT QUANTUM COMMUNICATION BASED ON SOLID-STATE PHOTON EMITTERS

CROSS-REFERENCE TO RELATED APPLICATIONS

The present application claims the benefit of the filing date of U.S. Provisional Application Ser. No. 60/725,414 entitled "Method and Apparatus for Fault-tolerant Quantum Communications Based On Solid-State Photon Emitters," and filed on Oct. 11, 2006.

The above cross-referenced related application is hereby incorporated by reference herein in its entirety.

STATEMENT REGARDING FEDERALLY SPONSORED RESEARCH OR DEVELOPMENT

This invention was made with government support under PHY-0134776 awarded by the National Science Foundation, DAAD 19-03-1-0199 awarded by the U.S. Army, and N00014-02-1-0599 awarded by the U.S. Office of Naval Research. The government has certain rights in this invention.

BACKGROUND OF THE INVENTION

1. Field of the Invention

The present invention relates to long distance quantum communication.

2. Brief Description of the Related Art

Quantum communication holds promise for transmitting secure messages via quantum cryptography, and for distributing quantum information. See N. Gisin, G. Riborty, W. Tittel, and H. Zbinden, Rev. Mod. Phys 74, 145 (2002). However, attenuation in optical fibers fundamentally limits the range of direct quantum communication techniques, and extending them to long distances remains a conceptual and technological challenge. See G. Brassard, N. Lutkenhaus, T. Mor, and B. C. Sanders, Phys. Rev. Lett. 85, 1330 (2000). In principle, photon losses due, e.g., to attenuation, can be overcome by introducing intermediate quantum nodes and utilizing a so-called quantum repeater protocol. See H. J. Briegel, W. Dur, J. I. Cirac, and P. Zoller, Phys. Rev. Lett. 81, 5932 (1998). A repeater creates entanglement over long distances by building a backbone of entangled pairs between closely-spaced nodes. Performing an entanglement swap at each intermediate node (see M. Zukowski et al., Phys. Rev. Lett. 71, 4287 (1993)) leaves the outer two nodes entangled, and this long-distance entanglement can be used to teleport quantum information (see C. H. Bennett et al, Phys. Rev. Lett. 70, 1895 (1993) and D. Bouwmeester et al., Nature 390, 575 (1997)) or transmit secret messages via quantum key distribution (see A. Ekert, Phys. Rev. Lett. 67, 661 (1991)). Even though quantum operations are subject to errors, by incorporating entanglement purification (see C. Bennett et al., Phys. Rev. Lett. 76, 722 (1996) and D. Deutsch et al., Phys. Rev. Lett. 77, 2818 (1996)) at each step, one can extend entanglement generation to arbitrary distances without loss of fidelity in a time that scales polynomially with distance. For comparison, direct communication scales exponentially, making it impractical for long distances. While approaches to quantum repeaters based on many quantum bits (qubits) at each node (see B. B. Blinov et al., Nature 428, 153 (2004) and S. J. van Enk, J. I. Cirac, and P. Zoller, Science 279, 205 (1998)) or on photon storage in atomic ensembles (see L. M. Duan, M. D. Lukin, J. I. Cirac, and P. Zoller, Nature 414, 413 (2001)) are now being explored, realization of a robust, practical, system that can tolerate all expected errors remains a difficult task.

SUMMARY OF THE INVENTION

The present invention comprises a quantum repeater in which each node is formed by a single quantum emitter with two internal degrees of freedom. The present invention further comprises a novel protocol which achieves scalable quantum communication in the presence of arbitrary errors using fixed, minimal physical resources of just four states (two effective qubits) per node. In a preferred embodiment, the two qubits correspond to a pair of electronic spin sublevels ($|0\rangle, |1\rangle$) that allows for spin-selective optical excitation (see inset in FIG. 1a), and a proximal nuclear spin that provides an auxiliary memory. Although our approach is relevant to atomic systems, such as single atoms trapped in a cavity (see J. McKeever et al., Science 303, 1992 (2004)) or single trapped ions (see B. B. Blinov et al., Nature 428, 153 (2004)), it is particularly suitable for implementation with solid-state emitters, for example impurity color centers (see C. Kurtsiefer, S. Mayer, P. Zarda, and H. Weinfurter, Phys. Rev. Lett. 85, 290 (2000) and A. Beveratos et al., Phys. Rev. Lett. 89, 187901 (2002)) and quantum dots (see P. Michler et al., Science 290, 2282 (2000) and C. Santori et al., Nature 419, 594 (2002)). These devices offer many attractive features including optically accessible electronic and nuclear spin degrees of freedom, potential opto-electronic integrability, and fast operation.

The present invention is a method for producing entangled pairs of quantum bits ("qubits") at long distances, using physical systems with two qubits per system. In general, the present invention will yield non-classical correlations (e.g., violations of Bell's inequality) between two quantum systems at arbitrarily large distances. To do this, the present invention starts with a method (see below) for generating short distance entangled pairs. The method than proceeds with entanglement connection, a technique for taking two entangled pairs at short distance, and by local operations on one element of each pair, obtaining to a single entangled pair at a longer distance.

After connection, the present invention may use a novel form of entanglement purification to improve the entanglement of the longer distance pair. This purification approach, which uses only two qubits at each physical location, is distinct in its efficiency in terms of number of qubits necessary. All prior art uses a number of qubits per physical location that increases as the final, desired distance increases. The present invention removes this physical resource requirement by utilizing un-used, non-local qubits to improve the entanglement of the final pair.

The present invention further is a system for generating entanglement between two solid-state single photon emitters. Unlike previous proposals, the present invention is largely insensitive to spectral diffusion and homogeneous broadening of the solid-state emitters. Instead, the present invention utilize elastic scattering of a coherent light source (e.g., a laser). By using single photon emitters with several levels, each with different probabilities for scattering of the coherent light source, the present invention can generate entanglement by interference of the scattered light at a beam splitter. The quality of the entanglement (its "fidelity") is largely unaffected by the solid-state environment of the single photon emitter as the invention works in the elastic scattering regime. This procedure may or may not use techniques to enhance the scattering onto the beam splitter, such as Purcell effect enhancement in a photonic cavity.

In a preferred embodiment, the present invention is a method for producing entangled pairs of quantum bits ("qubits") at long distances, using physical systems with two qubits per system, where the method comprises the steps of generating short distance entangled pairs and generating an entanglement connection, wherein said step of generating an entanglement connection comprises a technique for taking two entangled pairs at short distance, and by local operations on one element of each pair, obtaining to a single entangled pair at a longer distance.

The method of a preferred embodiment may further comprise the step of performing entanglement purification to improve the entanglement of a longer distance pair. Still further, the step of performing entanglement purification may use only two qubits at each physical location. The step of performing entanglement purification may use un-used, non-local qubits to improve the entanglement of a final pair.

In another preferred embodiment, the invention is a system for generating entanglement between two solid-state single photon emitters. The system comprises a coherent light source and a plurality of nodes, each node comprising a single photon emitter with several levels, each with different probabilities for scattering of the coherent light source. The present invention can generate entanglement by interference of the scattered light at a beam splitter. A system may further comprise a photonic cavity.

In another preferred embodiment, the present invention is a method of quantum communication in a system comprising a plurality of nodes, wherein the method comprises the steps of generating entanglement between optically-active qubits in a first node and a second node adjacent said first node, mapping an optically-active qubit onto a memory qubit, leaving an optically-active qubit available to generate entanglement between unconnected nodes, projectively measuring from a third node adjacent said second node four Bell states in a manifold involving both the optically-active qubit and the memory qubit associated with an emitter at said second node and using the outcomes of the measurements of the four Bell states to obtain a singlet state in a remaining pair of memory qubits and implementing a deterministic entanglement swap to produce a memory qubit entanglement between said second and third nodes approximately mirroring said optically-active qubit entanglement between said first and second nodes.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 1(a) depicts an interferometric arrangement for entanglement generation in accordance with a preferred embodiment of the present invention. The inset in FIG. 1(a) shows the relevant level scheme. FIG. 1(b) shows entanglement propagation by swapping in accordance with a preferred embodiment of the present invention. FIG. 1(c) shows nested entanglement purification in accordance with a preferred embodiment of the present invention. The dots indicate an arbitrary number of nodes. In (i), the set of repeaters is split in half, two purified A pairs are created, and they are connected via adjacent central nodes. As shown in (ii), this yields an entangled B pair. In (iii), while storing the entangled pair in the endpoint stations, entangled A pairs are created and purified using the nearest neighbor and central nodes. In (iv), a Bell state measurement of the central and nearest neighbor nodes creates a C pair which is used to purify the B pair.

FIG. 2(a) shows fidelity scaling with distance. Points show results using 3 purification steps at each nesting level; dashed lines show the fixed point $F_{FP}$ at each distance; dotted lines indicate the asymptotic fidelity $F_1$. For (a) and (b), measurements and local two-qubit operations $\eta=p$ contain 0.5% errors. For (a), (b), and (c), the initial fidelity $F_0$ is (i) 100% (ii) 99% (iii) 98% (iv) 97% (v) 96% with phase errors only. FIG. 2(b) shows time scaling with distance for m=3, given in units of $T_0$, the time required to generate entanglement between nearest neighbors, and $L_0$, the distance between nearest neighbors. Note that the axes are logarithmic, so time scales polynomially with distance. FIG. 2(c) shows long-distance asymptote dependence on initial fidelity for phase errors only. FIG. 2(d) shows long-distance asymptote dependence on error type ($F_0$=0.99, and the shape parameter ranges from v=0 to v=0.3.)

FIG. 3 shows a preferred embodiment of the present invention implemented with solid-state photon emitters.

DETAILED DESCRIPTION OF THE PREFERRED EMBODIMENTS

Figure 1A:
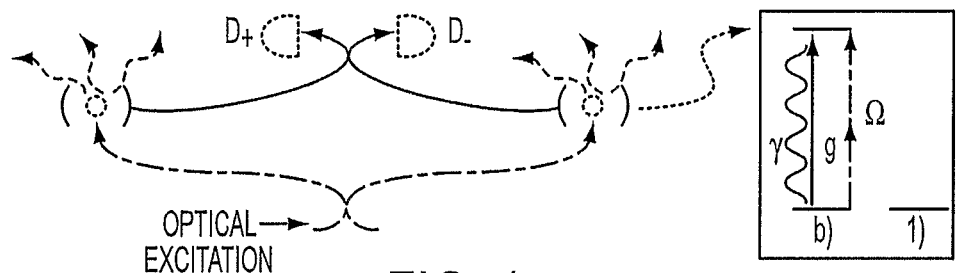
FIGS. 1(a)-(c) depict a protocol for fault-tolerant quantum communication in accordance with a preferred embodiment of the present invention.

The initial step in a preferred embodiment of the present invention is entanglement generation between two emitters separated by a distance $L_0$. In principle, entanglement can be generated probabilistically by a variety of means, e.g., Raman scattering (see C. Cabrillo, J. I. Cirac, P. Garcia-Fernandez, and P. Zoller, Phys. Rev. A 59, 1025 (1999)) or polarization-dependent fluorescence (see B. B. Blinov et al., Nature 428, 153 (2004). However, solid-state emitters often do not exhibit appropriate selection rules, and for our repeater protocol it is essential that the optical transition be independent of the nuclear spin state. We thus present an entanglement mechanism based on state-selective elastic light scattering (see FIGS. 1(a)-(c)) which meets these requirements.

As an example, consider the situation in which each emitter is placed inside a photonic cavity, whose output is coupled to a photonic fiber. The cavity is not essential for the present invention, but it enhances collection efficiency and frequency selection. The optical transition frequencies in each node are matched by careful selection or tuning of the emitters. Each node scatters light only if its electron spin is in state $|0\rangle$, such that two adjacent repeater nodes form state-selective mirrors in an interferometer (see FIG. 1(a)). If the interferometer is properly balanced (using, for example, auxiliary laser pulses or a double pass system where all pulses traverse the same path, removing the influence of slow drifts in the fibers (see L. Childress et al., quant-ph/0502112 and A. Muller et al., Appl. Phys. Lett. 70, 793 (1997)), then when both nodes are in the scattering state $|0\rangle$ the outgoing photons will always exit one detector arm $D_+$. Consequently, a detection event in the other arm $D_-$ must correspond to scattering by only one of the two nodes; since the photon could have scattered off either node, the $D_-$ measurement can project the nodal spins onto an entangled state.

Initially each node is prepared in a superposition state $(|0\rangle+|1\rangle)/\sqrt{2}$, and state $|0\rangle$ is coupled to an excited level that decays radiatively at a rate $\gamma$. In the weak excitation limit, we can adiabatically eliminate the excited state, and the light scattered off state $|0\rangle$ is well described as a coherent state. The combined state of node i and the scattered light field is then given by $|\psi\rangle_i \approx (|1\rangle+T_i|0\rangle)/\sqrt{2}$ with $$T_i = \exp[-\sqrt{P_{em}}(\sqrt{1-\epsilon}\hat{b}_i + \sqrt{\epsilon}\hat{a}_i) - P_{em}/2] \quad (1)$$

where $P_{em}$ is the total emission probability, $\epsilon$ comprises the net collection, propagation, and detection efficiency, and $\hat{a}_i, \hat{b}_i$ are the annihilation operators for the field reaching the beam splitter and other (loss) fields, respectively. Provided that $P_{em} \ll 1$, a detection event in detector $D_-$ (mode $\hat{d}_-\alpha\hat{a}_1-\hat{a}_2$) projects the system onto a maximally entangled state $\hat{d}_-(T_1|01\rangle+T_2|10\rangle)/2\alpha(|01\rangle-|10\rangle)/\sqrt{2}=|\Psi_-\rangle$. For finite $P_{em}$, there is a chance $\sim P_{em}$ that, during a successful $D_-$ detection event, an additional photon was emitted into the environment. Since the $|00\rangle$ and $|11\rangle$ states do not produce clicks in $D_-$, this will mainly result in some admixture of the state $|\Psi_+\rangle=(|01\rangle+|10\rangle)/\sqrt{2}$, which we refer to as a phase error. Another source of error is the homogeneous broadening typically found in solid-state emitters. We model this dephasing by a random energy shift of the excited state $|E\rangle$ with white-noise characteristics $(\langle\Delta(t)\Delta(t')\rangle=\Gamma\delta(t-t'))$. Solving the Heisenberg equations for an emitter coupled to a cavity with vacuum Rabi coupling g and linewidth $\kappa$, and averaging over the noise, we obtain the fidelity loss associated with homogeneous broadening (see L. Childress et al., quant-ph/0502112). Putting these considerations together, we find that the scheme succeeds with probability $P=(1/2)(1-e^{-P_{ed}\epsilon/2})\approx\epsilon P_{em}/4$, producing the state $|\Psi_-\rangle$ in time $T_0 \approx (t_0+t_c)/P$ with fidelity $$F_0 \approx \frac{1}{2}(1+e^{-P_{em}(1-\epsilon)})-\gamma_e(t_0+t_c)-\frac{3}{2}\frac{\Gamma}{\Gamma+\gamma}\frac{\kappa}{\kappa+\gamma}\frac{1}{1+4g^2/\kappa(\gamma+\Gamma)}. \quad (2)$$

Here, the first term can be derived from Eq. (1); the second term accounts for electron spin dephasing (at rate $\gamma_e$) during the excitation time $t_0$ and classical communication time $t_c$; the last term arises from homogeneous broadening. For realistic emitters placed into a cavity with a narrow linewidth, $\gamma\gg\kappa$ or a large Purcell factor $4g^2/(\kappa(\gamma+\Gamma))\gg 1$, the first two terms should dominate the error. Both of these terms introduce phase errors.

Figure 1B:
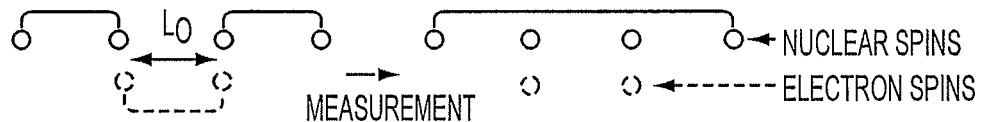

Using this procedure, electron spin entanglement can be generated between pairs of nodes. The electron spin state is then mapped onto the nuclear spin qubit for long-term storage using the hyperfine interaction, leaving the electronic degree of freedom available to generate entanglement between unconnected nodes, as illustrated in FIG. 1b. By combining optical detection of individual electron spin states (see F. Jelezko et al., Phys. Rev. Lett. 92, 076401 (2004)) and effective two-qubit operations associated with hyperfine coupling of electronic and nuclear spins (see J. M. Taylor et al., e-print: cond-mat/0407640 (2004) and F. Jelezko et al., Phys. Rev. Lett. 93, 130501 (2004)), we may projectively measure all four Bell states in the electronic/nuclear manifold associated with each emitter. The outcomes of the Bell state measurements reveal the appropriate local rotations to obtain a singlet state in the remaining pair of nuclear spins, implementing a deterministic entanglement swap (see M. Zukowski et al., Phys. Rev. Lett. 71, 4287 (1993) and C. H. Bennett et al, Phys. Rev. Lett. 70, 1895 (1993)). By performing this procedure in parallel, and iterating the process for N $\alpha$ log$_2$(L/L$_0$) layers, we obtain the desired nuclear spin entanglement over distance L in a time $\alpha$ L log$_2$ (L/L$_0$).

Figure 1C:
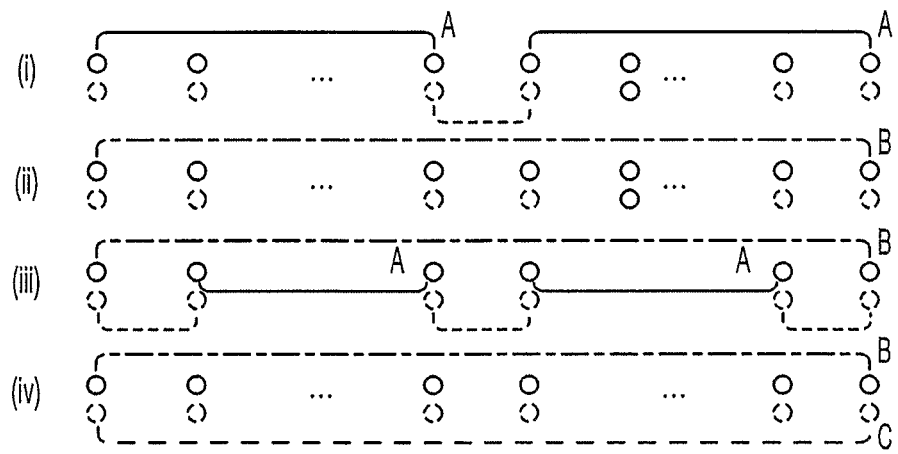

To extend entanglement to long distances in the presence of errors, active purification is required at each level of the repeater scheme. In FIG. 1(c) we present a method which accomplishes this without additional physical resources. Briefly, an entangled pair (which we label "B") is stored in the nuclear spins while an auxiliary entangled pair ("C") is generated in the electron spins using purified ("A" pairs) extending half the distance. The purification protocol described in D. Deutsch et al., Phys. Rev. Lett. 77, 2818 (1996) and W. Dur, H. J. Briegel, J. I. Cirac, and P. Zoller, Phys. Rev. A. 59, 169 (1999) is then performed by entangling the electron and nuclear spins and subsequently measuring the electron spins. Comparison of the measurement outcomes reveals whether the purification step was successful, resulting in a new stored pair B with higher fidelity. After successfully repeating the procedure for m consecutive purification steps, (a technique sometimes referred to as "entanglement pumping"), the stored pair becomes a purified ("A") pair. By induction, we may thus generate and purify entanglement to arbitrary distances (see L. Childress et al., quant-ph/0502112). This procedure is analogous to the proposal in H. J. Briegel, W. Dur, J. I. Cirac, and P. Zoller, Phys. Rev. Lett. 81, 5932 (1998), but avoids the increase in the number of qubits required for that proposal. By incorporating two extra connection steps in generating the auxiliary C pair, our protocol can be implemented with a single electronic and nuclear spin at each node.

Figure 2A:
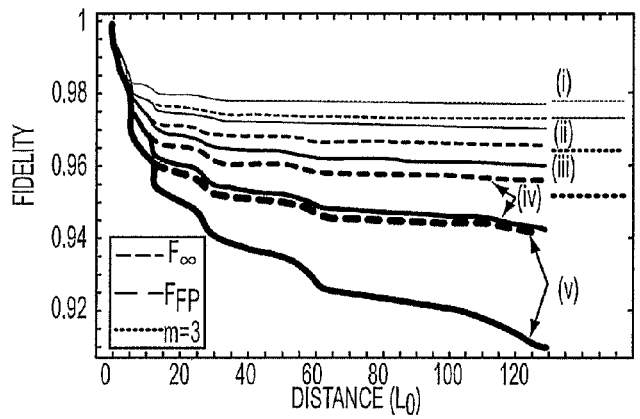
FIGS. 2(a)-(d) are a series of graphs relating to a preferred embodiment of the present invention.

The fidelity obtained at the end of this nested purification procedure, F(m, L, F$_0$, p, $\eta$), depends on the number of purification steps m, the distance L between the outer nodes, the initial fidelity F$_0$ between adjacent nodes, and the reliability of measurements $\eta\leq 1$ and local two-qubit operations p$\leq$1 required for entanglement purification and connection (see W. Dur, H. J. Briegel, J. I. Cirac, and P. Zoller, Phys. Rev. A. 59, 169 (1999). As the number of purification steps increases m$\rightarrow\infty$, the fidelity at a given distance L approaches a fixed point F$\rightarrow$F$_{FP}$ (L, F$_0$, p, $\eta$) at which additional purification steps yield no further benefit (see W. Dur, H. J. Briegel, J. I. Cirac, and P. Zoller, Phys. Rev. A. 59, 169 (1999)). Finally, as L increases, the fidelity may approach an asymptotic value FFP$\rightarrow$F$_\infty$(F$_0$, p, $\eta$), which is independent of distance (see L. Childress et al., quant-ph/0502112). This analysis neglects the long but finite coherence time of the nuclear spin, which will determine the ultimate distance over which the scheme may function. FIG. 2a illustrates the efficiency of the purification protocol: for initial fidelities F$_0$>97%, three purification steps suffice to produce entanglement at large distances. FIG. 2c shows that our scheme will operate in the presence of 1−p<1% errors in local operations and percent-level phase errors in initial entanglement fidelity. Other types of error are in principle possible. On average, the final fidelity obtained by the nested entanglement purification procedure depends only on the diagonal elements of the density matrix in the Bell state basis $\{|\Psi_-\rangle, |\Phi_-\rangle, |\Phi_+\rangle, |\Psi_+\rangle\}$, where $|\Phi\pm\rangle=(|00\rangle\pm|11\rangle)/\sqrt{2}$ (see D. Deutsch et al., Phys. Rev. Lett. 77, 2818 (1996)). We parameterize the initial fidelity by {F$_0$, $(1-F_0)\nu$, $(1-F_0)\nu$, $(1-F_0)(1-2\nu)\}$ in this basis, so that the shape parameter $\nu$ quantifies the weight of non-phase errors. Although the protocol we use is most effective for purifying phase errors, FIG. 2d indicates that it also tolerates arbitrary errors.

Figure 2B:
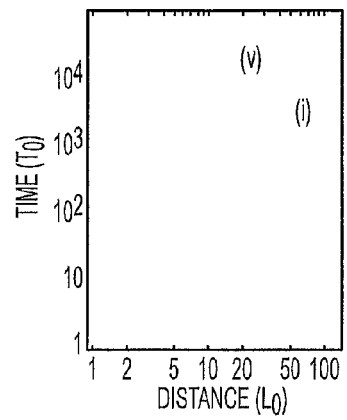
Figure 2C:
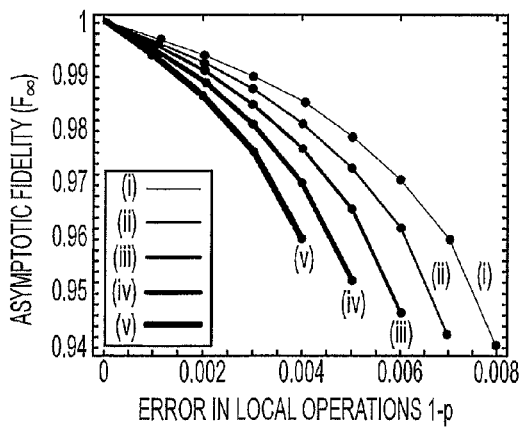
Figure 2D:
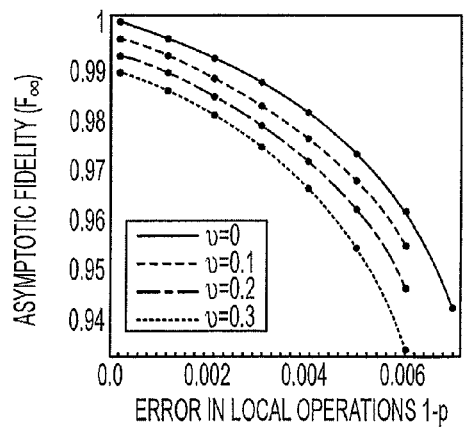

FIG. 2b demonstrates that our scheme operates in polynomial time. Because solid-state devices allow fast operations and measurements, the overall time scale is set by the classical communication time between nodes. As an example, using a collection efficiency set by a photon loss rate of ~0.2 dB/km and spacing $L0\sim 20$ km, a fidelity set by an emission probability $P_{em}\sim 8\%$, local errors $\eta=p=0.5\%$, and just one purification step at each nesting level, our scheme could potentially produce entangled pairs with fidelity $F\sim 0.8$ sufficient to violate Bell's inequalities over 1000 km in a few seconds. Moreover, the bit-rate could likely be significantly improved by employing optimal control theory to tailor the details of the repeater protocol to the parameters of a desired implementation. Further speed-up may be possible when collection efficiency is very high, e.g., by using coincidence detection in combination with time-bin encoding (see N. Gisin, G. Riborty, W. Tittel, and H. Zbinden, Rev. Mod. Phys 74, 145 (2002)). This approach also has advantages in terms of interferometric stability (see S. D. Barrett and P. Kok (2004), quant-ph/0408040 and C. Simon and W. T. M. Irvine, Phys. Rev. Lett. 91, 110405 (2004)).

Figure 3A:
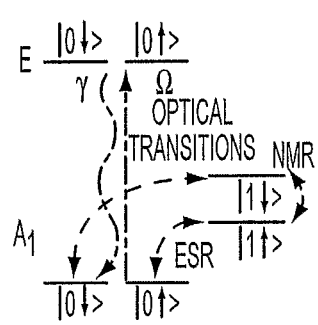
FIG. 3(a) shows electronic ($|0\rangle,|1\rangle$) and nuclear ($|\uparrow\rangle,|\downarrow\rangle$) states of the NV center coupled to a $^{13}C$ nuclear spin; their optical, microwave, and RF transitions.

We conclude with two specific examples for potential implementation of the presented method. The nitrogen vacancy (NV) center in diamond has a strong, state-selective optical transition (FIG. 3a) near 637 nm which has been used for robust generation of single photons on demand (see C. Kurtsiefer, S. Mayer, P. Zarda, and H. Weinfurter, Phys. Rev. Lett. 85, 290 (2000) and A. Beveratos et al., Phys. Rev. Lett. 89, 187901 (2002)) and single spin measurement (see F. Jelezko et al., Phys. Rev. Lett. 92, 076401 (2004). The triplet electron spin ground state is strongly coupled to a nearby $^{13}C$ impurity nuclear spin, which can have a very long coherence time (see C. Ramanathan et al., eprint: quant-ph/0408166 (2004)). Spin selective fluorescence allows electron spin initialization, measurement (see F. Jelezko et al., Phys. Rev. Lett. 92, 076401 (2004)) and entanglement with outgoing photons; electron spin resonance (ESR) and nuclear magnetic resonance (NMR) have already been employed to manipulate coupled electron and nuclear spins (see F. Jelezko et al., Phys. Rev. Lett. 93, 130501 (2004). In the ground state, the energy splitting between electron spin states $M_s=0$ and $M_s=\pm 1$ is an order of magnitude larger than the hyperfine interaction, effectively decoupling the nuclear and electronic spin states. Since the optical transition frequency between states with $M_s=0$ is independent of nuclear spin state, information may be safely stored in the nuclear spin during light scattering. For NV centers coupled to cavities with Purcell factors~10 (see C. Santori et al., Nature 419, 594 (2002)), we find that the dominant source of error is electron spin decoherence during the classical communication period. Using an emission probability $P_{em}\sim 5\%$, a collection efficiency $\epsilon\sim 0.2$, and a classical communication time of $t_c\sim 70$ μs over $L_0\sim 20$ km, we find the fidelity of directly entangled pairs can reach $F_0\sim 97\%$ for electron spin coherence times in the range of a few milliseconds. Electron spin coherence times in the range of 100 μs have been observed at room temperature and significant improvements are expected for high purity samples at low temperatures (see T. A. Kennedy et al., Appl. Phys. Lett. 83, 4190 (2003)). The large hyperfine splitting allows fast local operations between electron and nuclear spin degrees of freedom on a timescale~100 ns (see F. Jelezko et al., Phys. Rev. Lett. 93, 130501 (2004)) much shorter than the decoherence time, allowing $1-p<1\%$. Finally, cavity enhanced collection should significantly improve observed measurement efficiencies of $\eta\sim 80\%$ (see F. Jelezko et al., Phys. Rev. Lett. 93, 130501 (2004)).

Figure 3B:
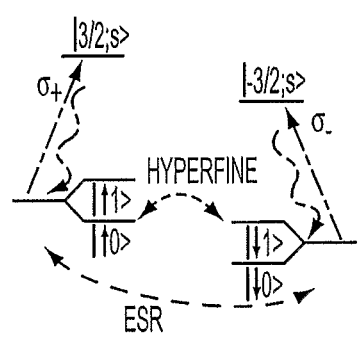
FIG. 3(b) shows electronic ($|\uparrow\rangle,|\downarrow\rangle$) and collective nuclear ($|0\rangle,|1\rangle$) states and their transitions for singly doped quantum dots in a polarized nuclear spin lattice. To suppress background light scattering, two-photon excitation can be used in both cases.

Semiconductor quantum dots (see C. Santori et al., Nature 419, 594 (2002)) represent another promising physical implementation (FIG. 3 (b)). By doping a neutral dot with a single electron, the ground state of the dot gains an electron spin degree of freedom. This spin state has been prepared and measured by state-selective optical transitions and Raman-based ESR in GaAs dots (see A. S. Bracker et al., e-print: cond-mat/0408466 (2004). Hyperfine coupling of the electron spin to the surrounding lattice of nuclear spins allows nuclear polarization and use of collective nuclear spin excitations as a quantum memory (see J. M. Taylor, C. M. Marcus, and M. D. Lukin, Phys. Rev. Lett. 90, 206803 (2003)) with potential coherence times on the order of seconds (see C. Ramanathan et al, eprint: quant-ph/0408166 (2004)). Although optical transitions in doped quantum dots can exhibit homogeneous broadening $\Gamma\sim 100$ GHz $\sim 10-100\gamma$ (see A. Kiraz et al., Phys. Rev. B 65, 161303(R) (2002)), the corresponding error can be made negligible by sending the output from the cavity through a frequency filter with a linewidth of a few hundred MHz (with weak driving this will have negligible effect on the collection efficiency (see L. Childress et al., quant-ph/0502112). Assuming a high degree of nuclear spin polarization (Pn>0.95) and active ESR pulse correction, the electron spin de-phasing time is expected to be 1 ms (see V. N. Golovach, A. Khaetskii, and D. Loss, eprint: cond-mat/0310655 (2003)). Both implementations may require frequency conversion to telecom wavelengths.

In conclusion, we have shown that by combining state-of-the-art solid state quantum optical emitters with techniques for electron and nuclear spin manipulation, quantum communication over long distances can be achieved. Potential applications may include secure transmission of secret messages over intercontinental distances.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for producing entangled pairs of quantum bits ("qubits") at long distances, using physical systems with two qubits per system, wherein each physical system is at a different location, comprising the steps of:

generating short distance entangled pairs based on state-selective elastic light scattering;

generating an entanglement connection, wherein said step of generating an entanglement connection comprises a technique for taking two entangled pairs at short distance, and by local operations on one element of each pair, obtaining to a single entangled pair at a longer distance, and performing entanglement purification to improve entanglement of said single entangled pair, wherein said entanglement purification purifies both bit errors and phase errors using only two qubits at each physical location and an additional unused non-local qubit at a distant physical location.

2. A method for producing entangled pairs of quantum bits according to claim 1, further comprising the step of performing entanglement purification to improve the entanglement of a longer distance pair.

3. A method for producing entangled pairs of quantum bits according to claim 2, wherein said step of performing entanglement purification uses un-used, non-local qubits to improve the entanglement of a final pair.

4. A system for generating entanglement between two solid-state single photon emitters comprising:
- a coherent light source;
- a plurality of nodes, each node comprising a single photon emitter with several levels, each with different probabilities for coherent scattering of the light source via state-selective elastic light scattering; and
- means for generating entanglement between optically-active qubits in a first node and a second node by interference of the scattered light at a beam splitter.

5. A system according to claim 4 further comprising a photonic cavity resonant with the coherent light source but not the solid state emitter.

6. A method of quantum communication in a system comprising a plurality of nodes, comprising the steps of:
- generating entanglement between optically-active qubits in a first node and a second node adjacent said first node;
- mapping an optically-active qubit onto a memory qubit;
- leaving an optically-active qubit available to generate entanglement between unconnected nodes;
- projectively measuring from a third node adjacent said second node four Bell states in a manifold involving both the optically-active qubit and the memory qubit associated with an emitter at said second node; and
- using the outcomes of the measurements of the four Bell states to obtain a singlet state in a remaining pair of memory qubits and implementing a deterministic entanglement swap to produce a memory qubit entanglement between said second and third nodes approximately mirroring said optically-active qubit entanglement between said first and second nodes.

* * * * *